United States Patent
Lovasz et al.

(10) Patent No.: US 10,800,236 B2
(45) Date of Patent: Oct. 13, 2020

(54) SOFT TOP CONVERTIBLE WIND DEFLECTOR

(71) Applicant: FORD GLOBAL TECHNOLOGIES, LLC, Dearborn, MI (US)

(72) Inventors: Ronald M. Lovasz, Allen Park, MI (US); Spencer M. Hicks, Pinckney, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 47 days.

(21) Appl. No.: 16/276,945

(22) Filed: Feb. 15, 2019

(65) Prior Publication Data

US 2020/0262281 A1 Aug. 20, 2020

(51) Int. Cl.
*B60J 7/22* (2006.01)
*B60J 7/12* (2006.01)

(52) U.S. Cl.
CPC .............. *B60J 7/223* (2013.01); *B60J 7/1291* (2013.01)

(58) Field of Classification Search
CPC ........................................................ B60J 7/223
USPC ..................................... 296/109, 116, 107.09
See application file for complete search history.

(56) References Cited

U.S. PATENT DOCUMENTS

| | | | | |
|---|---|---|---|---|
| 2,827,328 | A * | 3/1958 | O'Kane | B60J 7/223 454/150 |
| 4,538,852 | A * | 9/1985 | Lobo | B60N 2/879 296/91 |
| 5,833,305 | A | 11/1998 | Watzlawick et al. | |
| 6,416,120 | B1 * | 7/2002 | Schutt | B60J 7/22 296/217 |
| 6,443,520 | B1 | 9/2002 | Schmaelzle et al. | |
| 9,073,420 | B2 * | 7/2015 | Bauer | B60J 7/223 |
| 9,908,392 | B1 | 3/2018 | Nania | |
| 10,059,386 | B1 * | 8/2018 | Caples | B62D 35/005 |
| 2005/0110306 | A1 * | 5/2005 | Queveau | B60J 7/22 296/217 |
| 2017/0305244 | A1 * | 10/2017 | Kamioka | B60J 10/18 |
| 2018/0001753 | A1 * | 1/2018 | Kroeber | B60J 7/223 |
| 2018/0272848 | A1 | 9/2018 | Biasi Da Silva et al. | |

FOREIGN PATENT DOCUMENTS

| | | | | |
|---|---|---|---|---|
| DE | 19535593 A1 | | 3/1997 | |
| DE | 19646240 A1 | * | 5/1998 | ............. B60J 7/223 |
| DE | 102013102643 A1 | | 9/2014 | |

OTHER PUBLICATIONS

Machine Translation of DE19646240A1, printed from the EPO website, May 26, 2020.*

* cited by examiner

*Primary Examiner* — Jason S Morrow
(74) *Attorney, Agent, or Firm* — David Coppiellie; MacMillan, Sobanski & Todd, LLC

(57) ABSTRACT

A vehicle includes a header extending laterally between A-pillars, and a soft top, including a movable frame defining a roof of the vehicle and having a header bow that is selectively securable to the header, the frame movable between a forward closed position and a rearward retracted position. A wind deflector is mounted to the frame adjacent to the header bow and movable with the frame between the closed position and the retracted position, with the wind deflector positioned in front of the header bow when not in the closed position.

8 Claims, 3 Drawing Sheets

SOFT TOP CONVERTIBLE WIND DEFLECTOR

BACKGROUND OF THE INVENTION

The present invention relates to a vehicle having a soft top convertible roof and more particularly to a wind deflector for such a vehicle roof.

For many conventional vehicles having convertible roofs the soft top or convertible top are designed to stow inside the vehicle structure when retracted, which protects the soft material while in such retracted position. However, for some vehicles, it may be preferred to have the soft top/convertible sit above the vehicle structure when the in fully retracted position, which allows the air flow from vehicle movement to enter the front (leading) edge of the top. This air flow when in such an exposed retracted position may allow for buffeting or ballooning of the soft top to occur.

SUMMARY OF THE INVENTION

An embodiment contemplates a vehicle including a header extending laterally between A-pillars; a soft top, including a movable frame defining a roof of the vehicle and having a header bow that is selectively securable to the header, the frame movable between a forward closed position and a rearward retracted position; and a wind deflector mounted to the frame adjacent to the header bow and movable with the frame between the closed position and the retracted position, with the wind deflector positioned in front of the header bow when not in the closed position.

An embodiment contemplates a method of operating a soft top of a vehicle may comprise releasing a header bow of a soft top from a header of the vehicle; pivoting a wind deflector from under the header bow to in front of the header bow as the header bow moves out of contact with the header; and redirecting air flow, with the wind deflector, up and over the header bow as the vehicle moves forward.

An advantage of an embodiment is a wind deflector that is located at the front of the soft top/soft convertible top header bow avoids potentially undesirable buffeting or ballooning of the top when in the fully retracted position. In addition, the wind deflector articulates automatically as the soft top/convertible top system moves from the closed position to the top fully retracted position.

DETAILED DESCRIPTION

Figure 1:
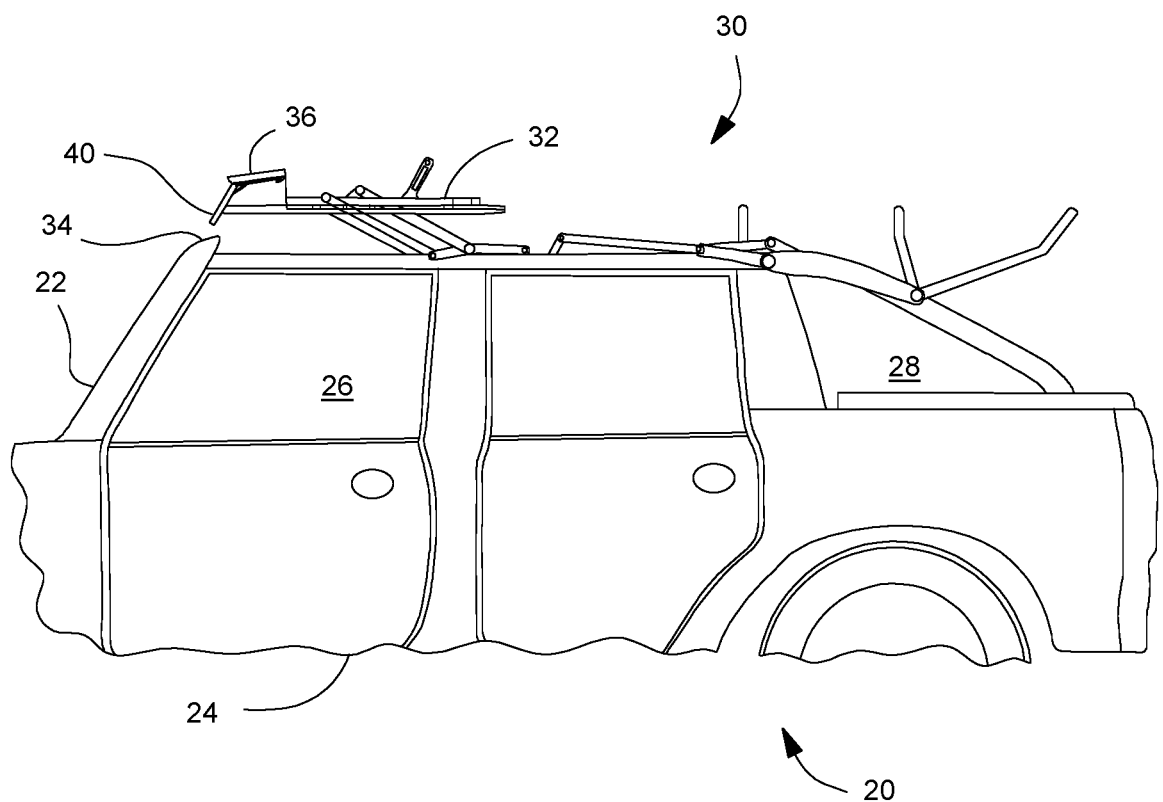
FIG. 1 is a schematic side view of a portion of a vehicle having a soft top shown in a mostly closed position.
Figure 2:
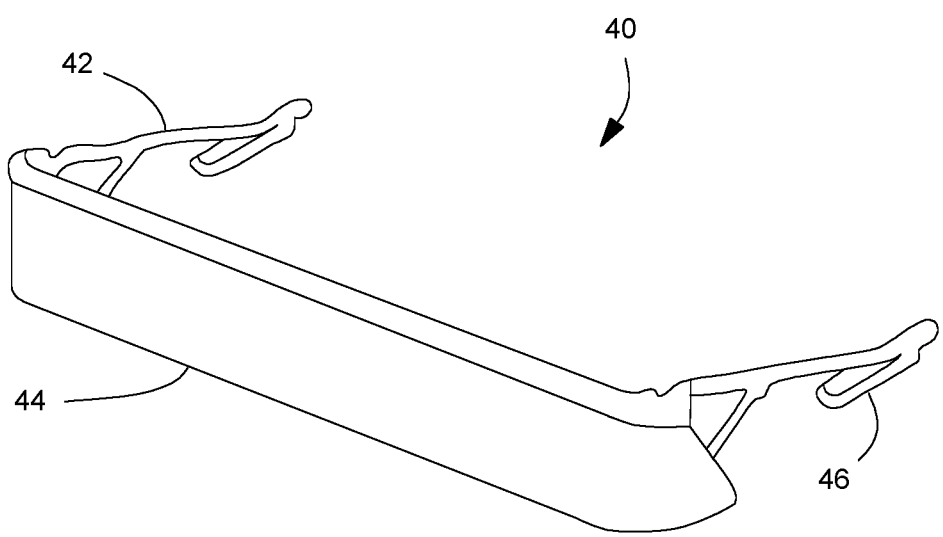
FIG. 2 is a schematic perspective view of a wind deflector.
Figure 3:
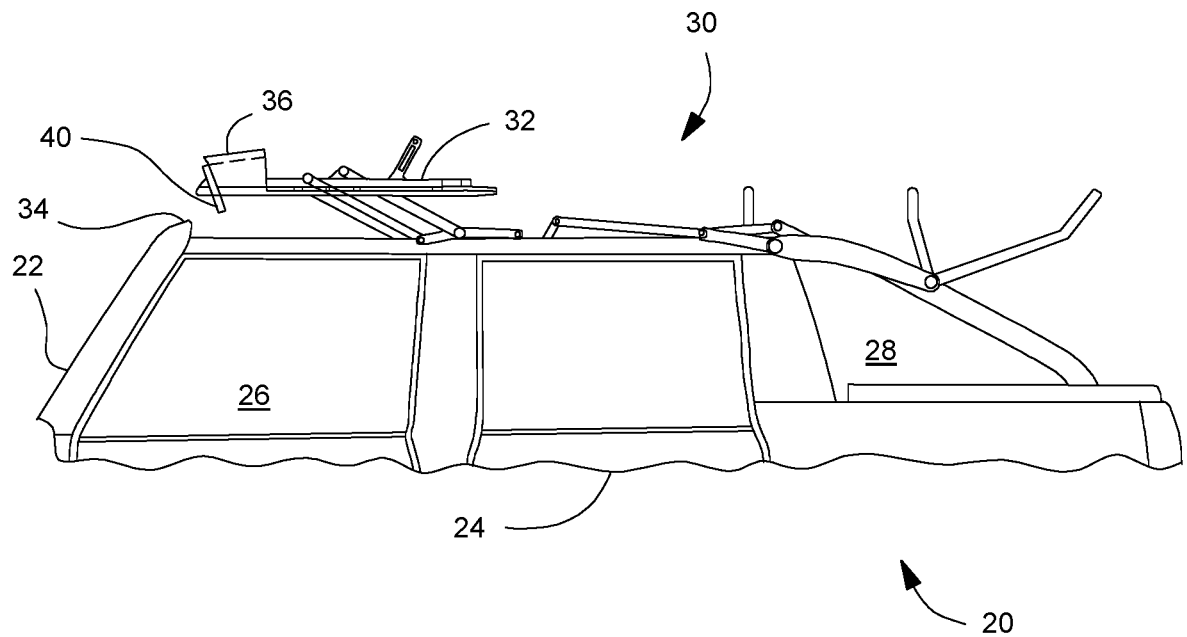
FIG. 3 is a schematic view similar to FIG. 1, showing the wind deflector in a different position.
Figure 4:
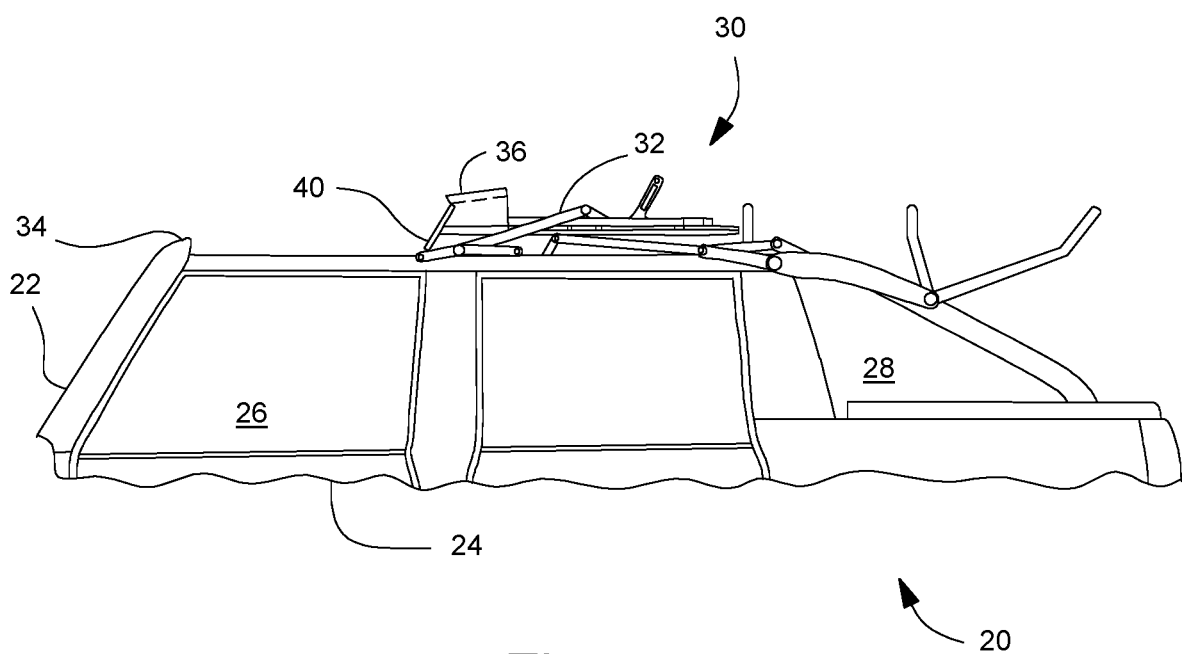
FIG. 4 is a schematic view similar to FIG. 1, showing the soft top in a partially open (partially retracted) position.
Figure 5:
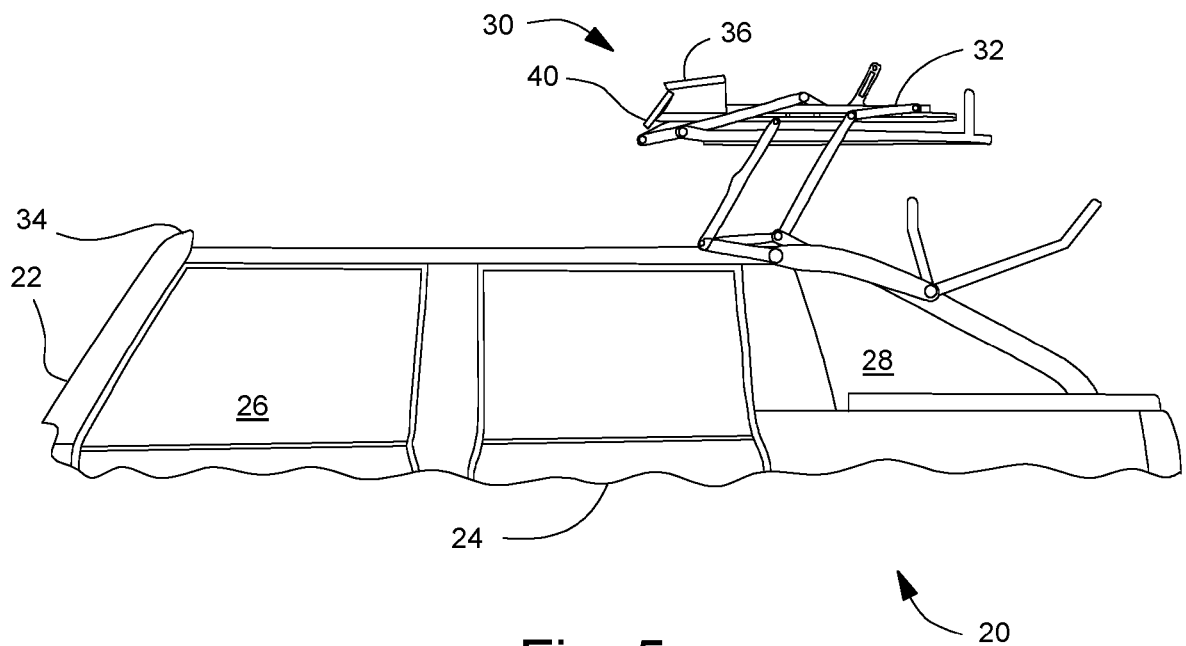
FIG. 5 is a schematic view similar to FIG. 1, showing the soft top in a mostly open (mostly retracted) position.
Figure 6:
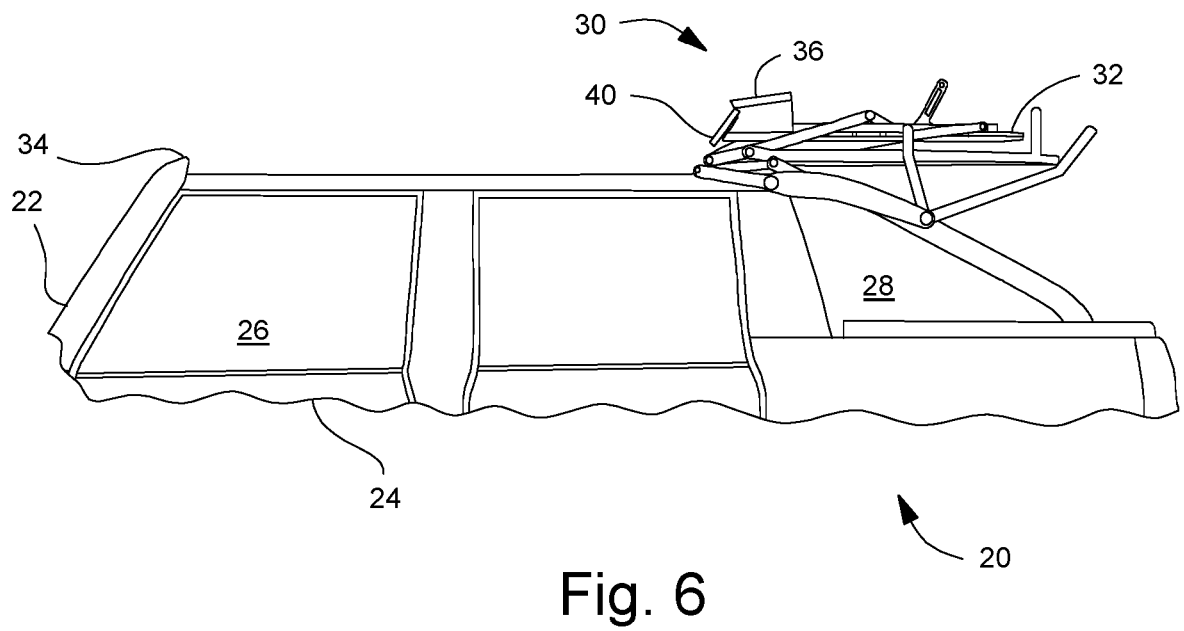
FIG. 6 is a schematic view similar to FIG. 1, showing the soft top in a fully open (retracted) position.

FIGS. 1-6 illustrate a vehicle 20 having A-pillars 22 extending vertically along the sides of a windshield, side doors 24, providing access to a passenger compartment 26, and a rear cargo area 28.

The vehicle 20 has a soft top 30, which is a frame 32 covered by a soft material, such as cloth, that essentially forms the roof of the vehicle 20. The soft top 30 is movable between a closed position, where it extends over and seals the top of the passenger compartment 26, and a retracted position where the roof is open to outside of the vehicle 20. The figures herein show a soft top where the middle portion of the roof is covered with the frame 32 and soft material between rigid portions of the vehicle body, but the soft top may also include vehicles where the entire roof is formed from the frame 32 and soft material as well.

Extending laterally (i.e., side-to-side) between the top of each A-pillar 22, along the top of the windshield, is a header 34. The frame 32 includes header bow 36 that is selectively securable to and releasable from the header 34. When the soft top 30 is in the closed position, with the intent to keep it closed, then the header bow 36 is secured to (such as with a latch) the header 34. When one wishes to open the soft top 30, one releases the header bow 36 from the header 34 and then moves the header bow 36 rearward relative to the vehicle 20 until the soft top 30 is in its retraced position (shown in FIG. 6).

Mounted to the front of and movable longitudinally with the header bow 36 is a wind deflector 40. The wind deflector 40 includes longitudinal arms 42 with attachment flanges 46 that secure the wind deflector 40 to the header bow 36 while allowing the wind deflector 40 to pivot relative to the header bow 36. Extending between the arms 42 is a deflector beam 44 that is shaped to deflect air upward over the header bow 36 when the header bow 36 is not latched to the header 34.

When the soft top 30 is in the closed position, the wind deflector 40 is located on the B-side of the header bow 36. The B-side is under the header bow 36 and soft top 30 (i.e., within the vehicle passenger compartment 26). When the header bow 36 is unlatched from the header 34 and starts to move rearward, the wind deflector 40 pivots downward and forward relative to the header bow 36 (see FIG. 1), which positions the deflector beam 44 in the vehicle air stream in front of the header bow 36. As the soft top 30 continues to be moved rearward relative to the vehicle 20, the wind deflector 40 continues to position the deflector beam 44 in the vehicle air stream in front of the header bow 36 (see FIGS. 3-6). As can be seen in these figures, this position in front of the header bow 36 remains throughout all of the partial open positions (FIGS. 3-5) of the soft top 30 and in the fully retracted position (see FIG. 6) as the frame 32 of the soft top 30 is moved rearward.

As noted above, then, this position of the wind deflector 40 the deflector beam 44 redirects the air flow (as the vehicle moves in a forward direction) upward over the top of the header bow 36 for all positions when the header bow 36 is not latched to the header 34 (i.e., the closed position). By deflecting the air flow in this way, the air flow does not catch on the underside of the soft cloth material, thereby preventing buffeting or ballooning under the cloth, which may potentially damage the cloth of the soft top 30.

While certain embodiments of the present invention have been described in detail, those familiar with the art to which this invention relates will recognize various alternative designs and embodiments for practicing the invention as defined by the following claims.

The invention claimed is:
1. A vehicle comprising:
a header extending laterally between A-pillars;
a soft top, including a movable frame defining a roof of the vehicle and having a header bow that is selectively securable to the header, the frame movable between a forward closed position and a rearward retracted position; and a wind deflector mounted to the frame adjacent to the header bow and movable with the frame between the closed position and the retracted position, with the wind deflector positioned in front of the header bow when not in the closed position, wherein the wind deflector includes a deflector beam configured to direct air up over the header bow when the soft top is not in the closed position, and wherein the deflector includes a pair of longitudinally extending arms that support the deflector beam on the header bow.

2. The vehicle of claim 1 wherein the arms are configured to pivot the deflector beam under the header bow when the soft top is in the closed position and pivot the deflector beam in front of the header bow when the soft top is not in the closed position.

3. The vehicle of claim 1 wherein the header bow is configured to be exposed to an air stream flowing past the vehicle when in the retracted position.

4. A method of operating a soft top of a vehicle comprising:

releasing a header bow of a soft top from a header of the vehicle;

pivoting a wind deflector from under the header bow to in front of the header bow as the header bow moves out of contact with the header; and redirecting air flow, with the wind deflector, up and over the header bow as the vehicle moves forward.

5. The method of claim 4 further comprising:

moving the wind deflector rearward with the header bow as the soft top moves rearward from the closed position to the retracted position.

6. The method of claim 5 wherein the wind deflector includes a laterally extending deflector beam and arms extending from the deflector beam that mount the deflector beam to the header bow; and the arms pivoting the deflector beam from a position under the header bow when the soft top is in the closed position to in front of the header bow when the soft top is not in a closed position.

7. The method of claim 4 wherein the wind deflector includes a laterally extending deflector beam and arms extending from the deflector beam that mount the deflector beam to the header bow; and the arms pivoting the deflector beam from a position under the header bow when the soft top is in the closed position to in front of the header bow when the soft top is not in a closed position.

8. A vehicle comprising:

a header extending laterally between A-pillars;

a soft top, including a movable frame defining a roof of the vehicle and having a header bow that is selectively securable to the header, the frame movable between a forward closed position and a rearward retracted position; and a wind deflector mounted to the frame adjacent to the header bow and movable with the frame between the closed position and the retracted position, with the wind deflector positioned in front of the header bow when not in the closed position, wherein the wind deflector is configured to pivot the deflector beam under the header bow when the soft top is in the closed position and pivot the deflector beam in front of the header bow when the soft top is not in the closed position.

* * * * *